United States Patent
Takaoka (10) Patent No.: US 6,603,616 B2
(45) Date of Patent: Aug. 5, 2003

(54) CONTROL METHOD AND APPARATUS OF MAGNETIC DISC DEVICE, RECORDING MEDIUM, AND INSPECTION METHOD AND APPARATUS OF MAGNETIC DISC DEVICE

(75) Inventor: Tetsuro Takaoka, Ehime (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 439 days.

(21) Appl. No.: 09/742,505

(22) Filed: Dec. 21, 2000

(65) Prior Publication Data

US 2002/0057518 A1 May 16, 2002

(30) Foreign Application Priority Data

Oct. 3, 2000 (JP) ....................... 2000-303355

(51) Int. Cl.[7] ................ G11B 27/36; G11B 5/596; G11B 21/02
(52) U.S. Cl. ................ 360/31; 360/77.08; 360/75
(58) Field of Search .................. 360/69, 75, 77.02, 360/77.07, 77.08, 78.09, 31; 702/186; 324/210

(56) References Cited

U.S. PATENT DOCUMENTS 5,825,318 A * 10/1998 Patapoutian et al. ........ 341/131
6,025,712 A * 2/2000 Mian ........................ 324/210

FOREIGN PATENT DOCUMENTS

| JP | 07-201146 | | 8/1995 | |
| JP | 2000260138 A | * | 9/2000 | ........... G11B/21/10 |

* cited by examiner

Primary Examiner—Andrew L. Sniezek
(74) Attorney, Agent, or Firm—RatnerPrestia (57) ABSTRACT

Noise level superposed on the head position detected by a position detector 103 is measured by a noise measuring unit 110, and an estimate position gain corresponding to the measured noise level is determined by a gain determining unit 111. An estimator 106 adds the logically calculated model position, and the result of the difference between the detected position and model position multiplied by the estimate position gain, so that the estimate position is calculated at high precision.

32 Claims, 9 Drawing Sheets

CONTROL METHOD AND APPARATUS OF MAGNETIC DISC DEVICE, RECORDING MEDIUM, AND INSPECTION METHOD AND APPARATUS OF MAGNETIC DISC DEVICE

BACKGROUND OF THE INVENTION

1. Field of the Invention

The present invention relates to a magnetic disc device, and more particularly to position estimation and position control of magnetic head. The invention further relates to an inspection of magnetic disc device.

2. Description of the Related Art

In a magnetic disc device used as an external memory device, servo information is written on a recording medium in order to control the head position.

One of such methods is the sector servo system. This is a method of causing the head to follow up an arbitrary track on the basis of the position information from the servo sector provided at the beginning of data region of track.

The servo sector is basically composed of a synchronization unit for detecting the servo sector, a track number unit in which the track number of tack is written, and a burst unit in which the burst number for tracking is written.

Tracking of magnetic head is realized by burst signals detected by the magnetic head. Therefore, the tracking precision depends on the detecting precision of burst signals. That is, magnetic noise occurring in the magnetic head and magnetic recording medium has adverse effects on the tracking precision. It is hence an object to obtain accurate tracking position information by separating the noise superposing on the burst signals.

SUMMARY OF THE INVENTION

The invention is devised to achieve the above object.

The control apparatus of magnetic disc device of the invention comprises a position detector for detecting the position of a head in the track width direction from a burst signals, noise measuring means for measuring noise level superposed on the detected position, gain determining means for determining an estimate gain corresponding to the noise level, and an estimator for estimating the state of an actuator.

The control method of magnetic disc device of the invention comprises (a) a step of detecting the position of a head in the track width direction from a burst signal, (b) a step of measuring noise level superposed on the head position, (c) a step of determining an estimate gain corresponding to the noise level, and (d) a step of estimating the state of an actuator.

The recording medium of magnetic disc device of the invention stores program data for executing the control method of magnetic disc.

The inspection apparatus of magnetic disc device of the invention adds the amplitude values of burst signals used in position control of the head, calculates the average of the added amplitude values and the variance value or standard deviation, and inspects the magnetic disc device by the variance value or standard deviation.

The inspection method of magnetic disc device of the invention comprises a step of adding the amplitude values of burst signals used in position control of the head, and a step of calculating the average of the added amplitude values and the variance value or standard deviation, and therefore the magnetic disc device is inspected by the calculated variance value or standard deviation.

DESCRIPTION OF THE PREFERRED EMBODIMENTS

Embodiment 1

Embodiment 1 of the invention is described by referring to FIG. 1, FIG. 2, and FIG. 4A to FIG. 4C.

Figure 1:
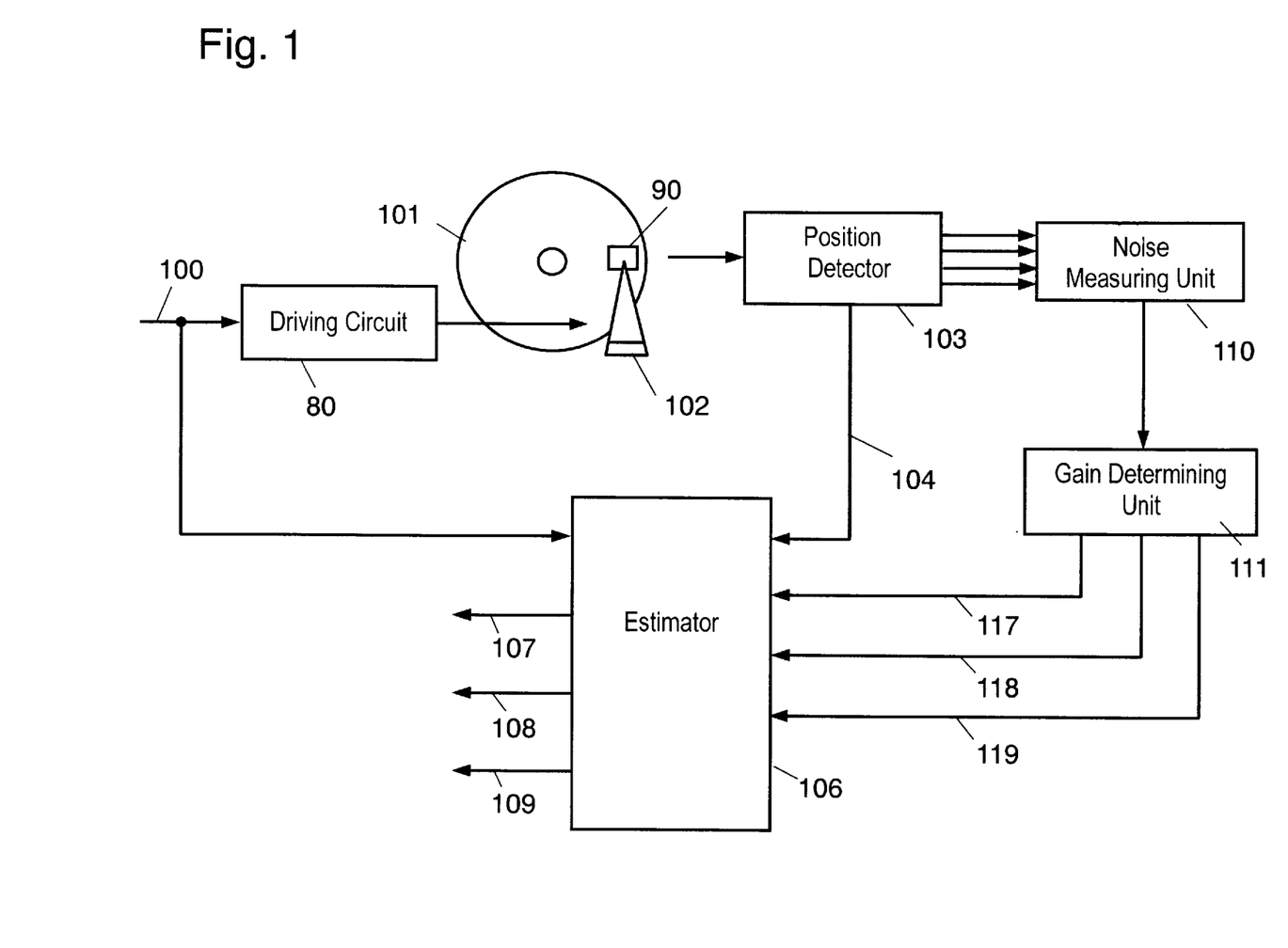
FIG. 1 is a schematic block diagram of a magnetic disc device in embodiment 1 of the invention.

In FIG. 1, a magnetic disc 101 is rotated by a spindle motor (not shown).

Figure 4A:
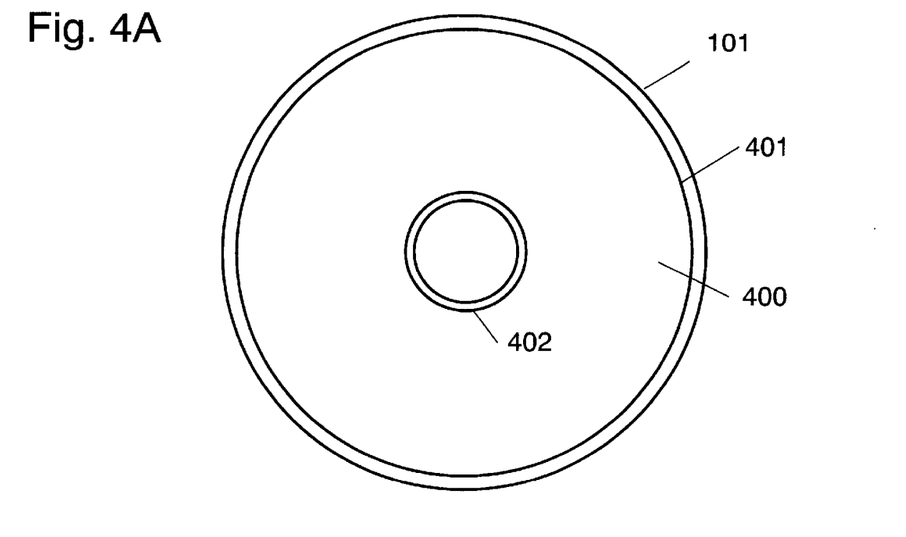
FIG. 4A to FIG. 4C are format explanatory diagrams of servo sector according to the invention.

As shown in FIG. 4A, plural tracks are present concentrically on a recording medium 400 of the magnetic disc 101. Each track is identified with a track number. Specifically, the outermost track 401 is number 0, and the largest number is given to the innermost track 402.

Figure 4B:
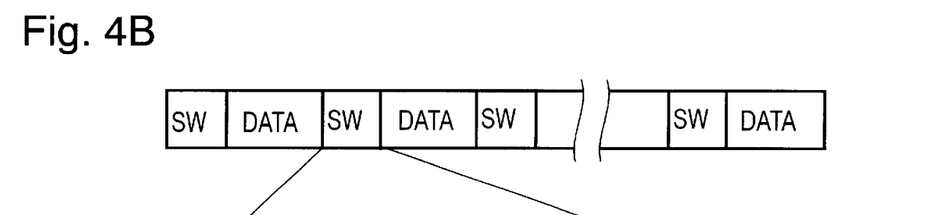

As shown in FIG. 4B, each track is alternately composed of data sector (DATA) and servo sector (SW).

Figure 4C:
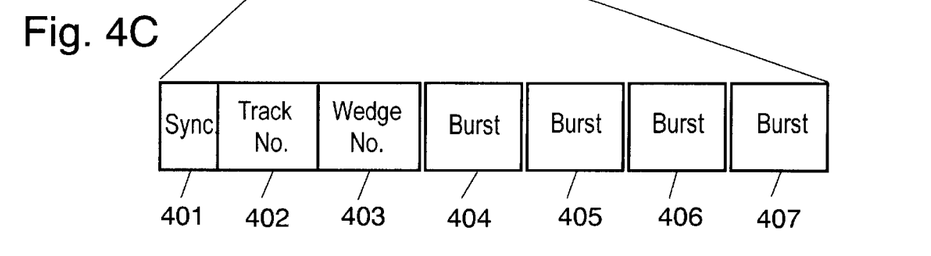

The servo sector is composed of the following parts as shown in FIG. 4C.

(1) Synchronization unit 401 in which sync signal is recorded.

(2) Track number unit 402 in which track number is recorded.

(3) Wedge number units 403 in which servo sector number is recorded.

(4) Burst units 404, 405, 406, 407 for detecting the position of head 90 in track width direction.

In each one of the burst units 404 to 407, burst signal A, burst signal B, burst signal C, and burst signal D differing in frequency are recorded.

A position detector 103 is composed of the following circuits (not shown).

(1) A head amplifier for amplifying the reproduced signal from the head 90.

(2) An AGC amplifier for controlling the amplified reproduced signal at a specific amplitude.

(3) A binary circuit for converting the output signal from the AGC amplifier into a digital signal.

(4) A servo sector detecting circuit for detecting the servo sector from the output signal of the binary circuit.

(5) A detection timing generating circuit for generating the timing for detecting the track number unit 402, and burst units 404 to 407 of the servo sector.

(6) A track information detecting circuit for detecting the track number and wedge number from the binary signal.

(7) A position signal generating circuit for detecting the amplitude of the amplified burst signals A, B, C, D, issuing the detected signals VA, VB, VC, VD by A/D conversion.

This position signal generating circuit also issues position information (POS) of magnetic head in the track width direction from the digitally converted burst signals.

A noise measuring unit 110 measures, for example, VA and VB in a state controlled so that VA and VB may be at same level, and adds the measured values. This addition is operated in each servo sector. By statistic processing, the average of the added values, and the variance value as noise level are calculated.

A gain determining unit 111 determines estimate position gain (LC1) 117, estimate speed gain (LC2) 118, and estimate deviation gain (LC3) corresponding to the variance value of noise calculated in the noise measuring unit 110.

Figure 2:
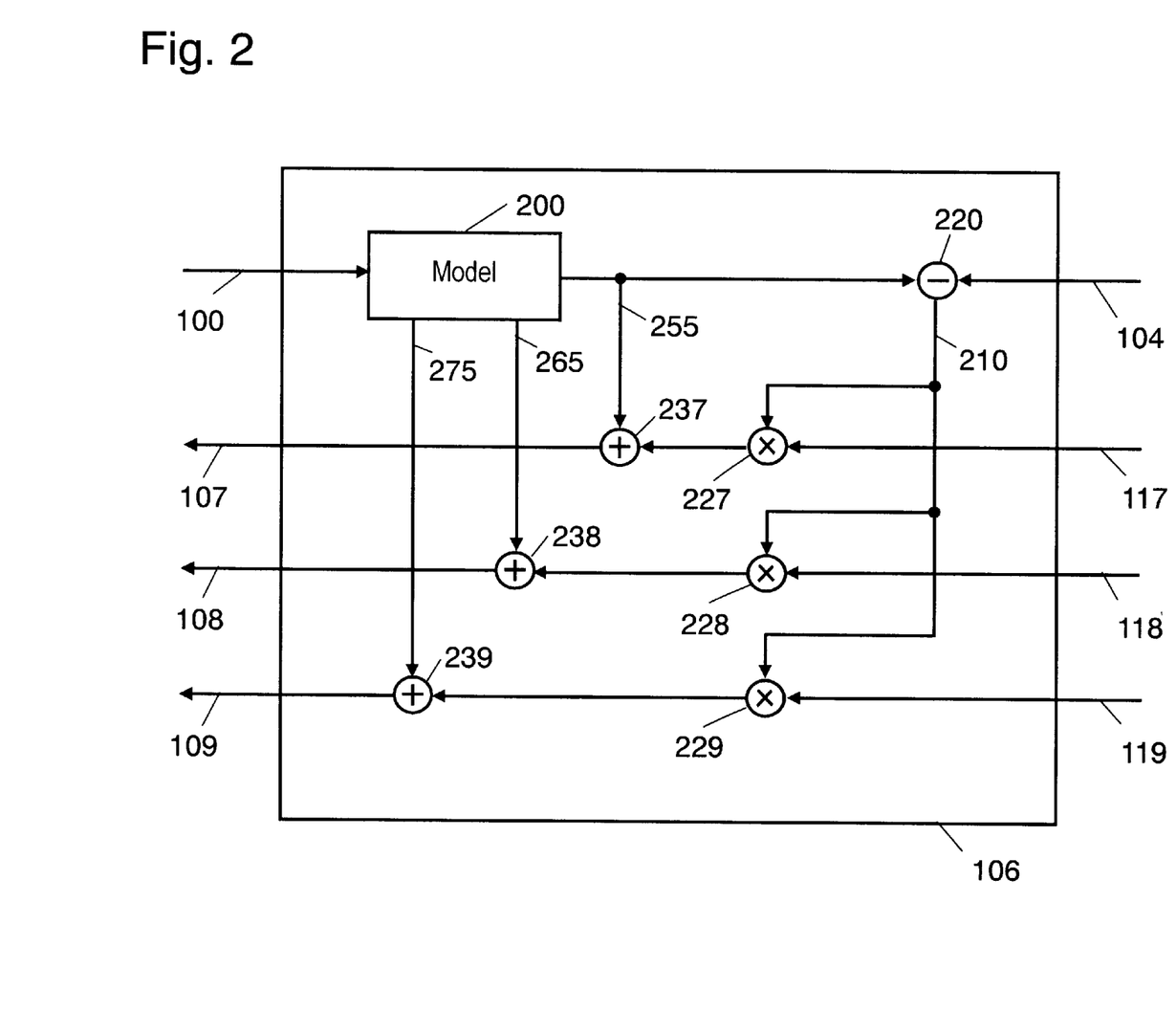
FIG. 2 is a schematic block diagram of an estimator in embodiment 1 of the invention.

The estimator 106 shown in FIG. 2 is explained.

A subtractor 210 subtracts model position (XEP1) from head position (POS), and calculates estimate error (ESTERR) 220.

A multiplier 227 multiplies estimate error (ESTERR) by estimate position gain (LC1). An adder 237 adds model position (XEP1) to multiplies the result of this multiplication, and calculates estimate position (XE1).

A multiplier 228 multiplies estimate error (ESTERR) by estimate position gain (LC2). An adder 238 adds model speed (XEP2) to the result of this multiplication, and calculates estimate speed (XE2).

A multiplier 229 multiplies estimate error (ESTERR) by estimate position gain (LC3). An adder 239 adds model deviation (XEP3) to the result of this multiplication, and calculates estimate deviation (XE3).

Hereinafter, the method of calculation is specifically explained about model position (XEP1), model speed (XEP2), model deviation (XEP3), estimate position gain (LC1), estimate speed gain (LC2), and estimate deviation gain (LC3).

First, the estimate position and the estimate speed are determined. The model position (XEP1) and the model speed (XEP2) are determined in the following formula 1.

$$d(XEP)dt = F \cdot XEP + G \cdot U \tag{1}$$

where $$XEP = \begin{bmatrix} XEP1 \\ XEP2 \end{bmatrix}, F = \begin{bmatrix} 0 & 1 \\ 0 & 0 \end{bmatrix}, G = \begin{bmatrix} 0 \\ Kp \end{bmatrix}, Kp \text{ is a constant.}$$

In the sampling control system, formula 1 can be expressed in an equation of discrete time system as shown in formula 2.

$$XEP(k+1) = PHI \cdot XEP(k) + GAMMA \cdot U(k) \tag{2}$$

Using PHI and GAMMA in formula 2, estimate position gain (LC1) and estimate speed gain (LC2) are determined in formula 3.

$$\left. \begin{array}{l} P = ((GAMMA)Q(GAMMA)^t)^{-1} + [1\ 0]^t R^{-1} [1\ 0])^{-1} \\ P2 = (PHI)P(PHI)^t + (GAMMA)Q(GAMMA)^t \\ LC = P2[1\ 0]^t (R + [1\ 0]P2[1\ 0]^t)^{-1} \end{array} \right\} \tag{3}$$

where $$LC = \begin{bmatrix} LC1 \\ LC2 \end{bmatrix}$$

In formula 3, R is a noise variance matrix preliminarily measured in the noise measuring unit 110, and Q is a noise variance matrix to be superposed on the control input U.

The estimate position and estimate speed are calculated by using XEP1, XEP2, LC1, LC2 and POS obtained above.

However, when the estimate position and the estimate speed are calculated in such method, due to effects of disturbance or model error occurring between the model and actual actuator, a deviation occurs in the calculated value. Considering this deviation, the algorithm of calculation is explained below.

Suppose to determine model position (XEP1), model speed (XEP2), and model deviation (XEP3). Assuming the estimate position to be XE1, estimate speed to be XE2, and estimate deviation to be XE3, then XEP1, XEP2, and XEP3 are determined in formula 4.

$$d(XEP)dt = F \cdot XE + G \cdot U \tag{4}$$

where $$XEP = \begin{bmatrix} XEP1 \\ XEP2 \\ XEP3 \end{bmatrix}, F = \begin{bmatrix} 0 & 1 & 0 \\ 0 & 0 & Kp \\ 0 & 0 & 0 \end{bmatrix}, G = \begin{bmatrix} 0 \\ Kp \\ 0 \end{bmatrix}, Kp \text{ is a constant.}$$

$$XE = \begin{bmatrix} XE1 \\ XE2 \\ XE3 \end{bmatrix}$$

In the sampling control system, formula 4 can be expressed in an equation of discrete time system as shown in formula 5.

$$XEP(k+1) = PHI \cdot XE(k) + GAMMA \cdot U(k) \tag{5}$$

Using PHI and GAMMA obtained herein, XEP1, XEP2, and XEP3 are calculated in formula 6.

By the algorithm shown in formula 6, estimate position XE1, model position XEP1, estimate speed XE2, model speed XEP2, estimate deviation XE3, and model deviation XEP3 are calculated.

$$
\left.\begin{aligned}
&① XE1(k) = XEP1(k-1) + LC1 \cdot (POS - XEP1(k-1)) \\
&② XE2(k) = XEP2(k-1) + LC2 \cdot (POS - XEP1(k-1)) \\
&③ XE3(k) = XEP3(k-1) + LC3 \cdot (POS - XEP1(k-1)) \\
&④ U \text{ is calculated.} \\
&⑤ XEP1(k) = XE1(k) + XE2(k) + PHI(1,3) \cdot XE3(k) + GAMMA(1) \cdot U \\
&⑥ XEP2(k) = XE2(k) + PHI(2,3) \cdot XE3(k) + GAMMA(2) \cdot U \\
&⑦ XEP3(k) = XE3(k) \\
&⑧ k = k+1
\end{aligned}\right\} \quad (6)
$$

As for the estimate deviation gain (LC3), an initial value is determined depending on the speed of response of control. Then, depending on the size of measured noise, it is set in a range of 0.5 times to 1.5 times of the initial value. Herein, LC1 and LC2 are the values determined in formula 3.

Noise measurement in the noise measuring unit 110 is specifically explained below.

Figure 5:
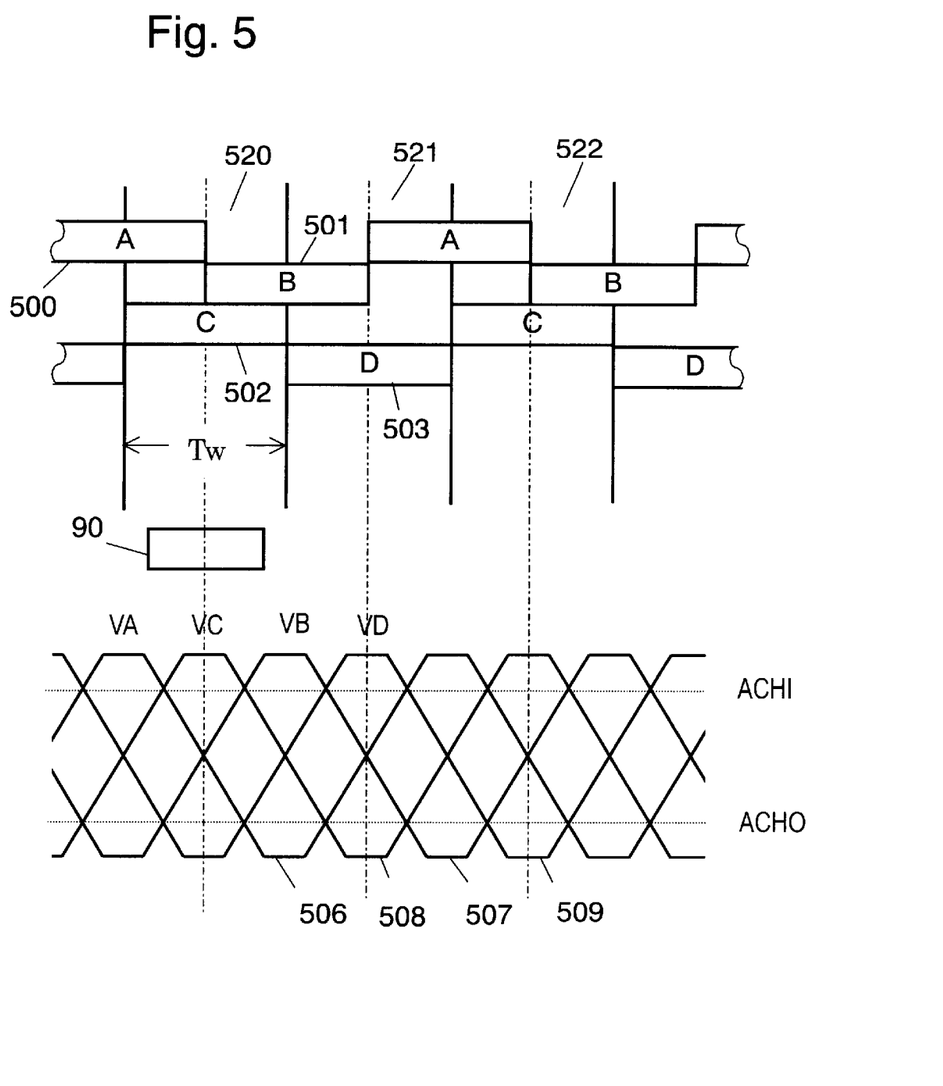
FIG. 5 is a diagram explaining the relation between the position of a magnetic head corresponding to the servo sector and the burst signal being reproduced.

The relation between the position of a magnetic head corresponding to the servo sector and the burst signal reproduced at this time is shown in FIG. 5.

As shown in FIG. 5, burst units 500, 501, 502, 503 are disposed among tracks 520, 521, 522. The track width of the tracks 520, 521, 522 is TW. Burst signal A, burst signal B, burst signal C, and burst signal D are recorded in the burst units 500, 501, 502, and 503, respectively.

The magnetic head 90 reproduces the burst signal corresponding to the position of the track in the track width direction. The burst signals reproduced by the magnetic head 90 are sent to the position detector, and those amplitudes are detected. As a result, corresponding to the position of the magnetic head, signals VA, VB, VC, VD shown in FIG. 5 are detected.

Figure 6:
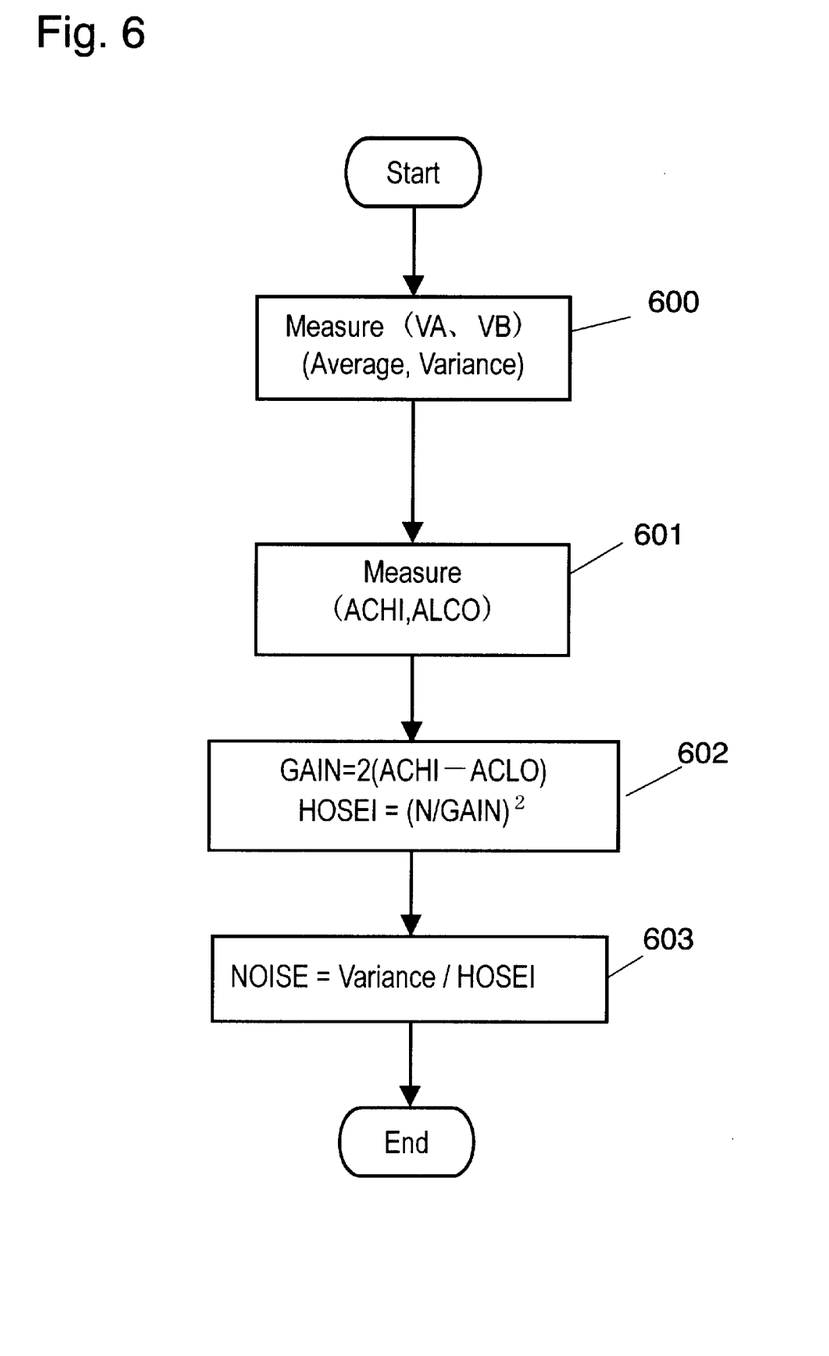
FIG. 6 is a flowchart of noise measurement and noise level correction in embodiment 1 of the invention.

FIG. 6 is a flowchart of noise measurement and noise level correction in embodiment 1. According to the following flowchart in FIG. 6, measurement of noise and its correction are explained.

<Step 600>

The position of the magnetic head 90 is controlled so that the values of signal VA and signal VB may be equal to each other. In this state, the noise measuring unit 110 measures signal VA and signal VB in each servo sector, and adds the measured values. The average and variance value of the added values determined in each sector are calculated.

<Step 601>

On even-number tracks, the position of the magnetic head 90 is controlled so that the values of signal VA and signal VC may be equal to each other. In this state, the value of signal VA (ACHI) is measured.

Similarly, on odd-number tracks, the position of the magnetic head 90 is controlled so that the values of signal VA and signal VC may be equal to each other. In this state, the value of signal VA (ACLO) is measured.

The difference of ACHI and ACLO corresponds to 0.5 track width.

<Step 602>

Calculating according to formula 7, correction value (HOSEI) for correcting the variance value determined at step 600 is obtained.

$$
\left.\begin{aligned}
GAIN &= 2*(ACHI - ACLO) \\
HOSEI &= (N/CAIN)^2
\end{aligned}\right\} \quad (7)
$$

where N is the number of bits per track width (TW).

<Step 603>

The variance value determined at step 600 is divided by the correction value obtained in formula 7. As a result, corrected variance value (Noise) is determined.

Herein, as the noise level, calculation of variance value is described, but standard deviation may be also calculated as noise level. In such a case, HOSEI in formula 7 is HOSEI= N/GAIN.

Embodiment 2

Figure 3:
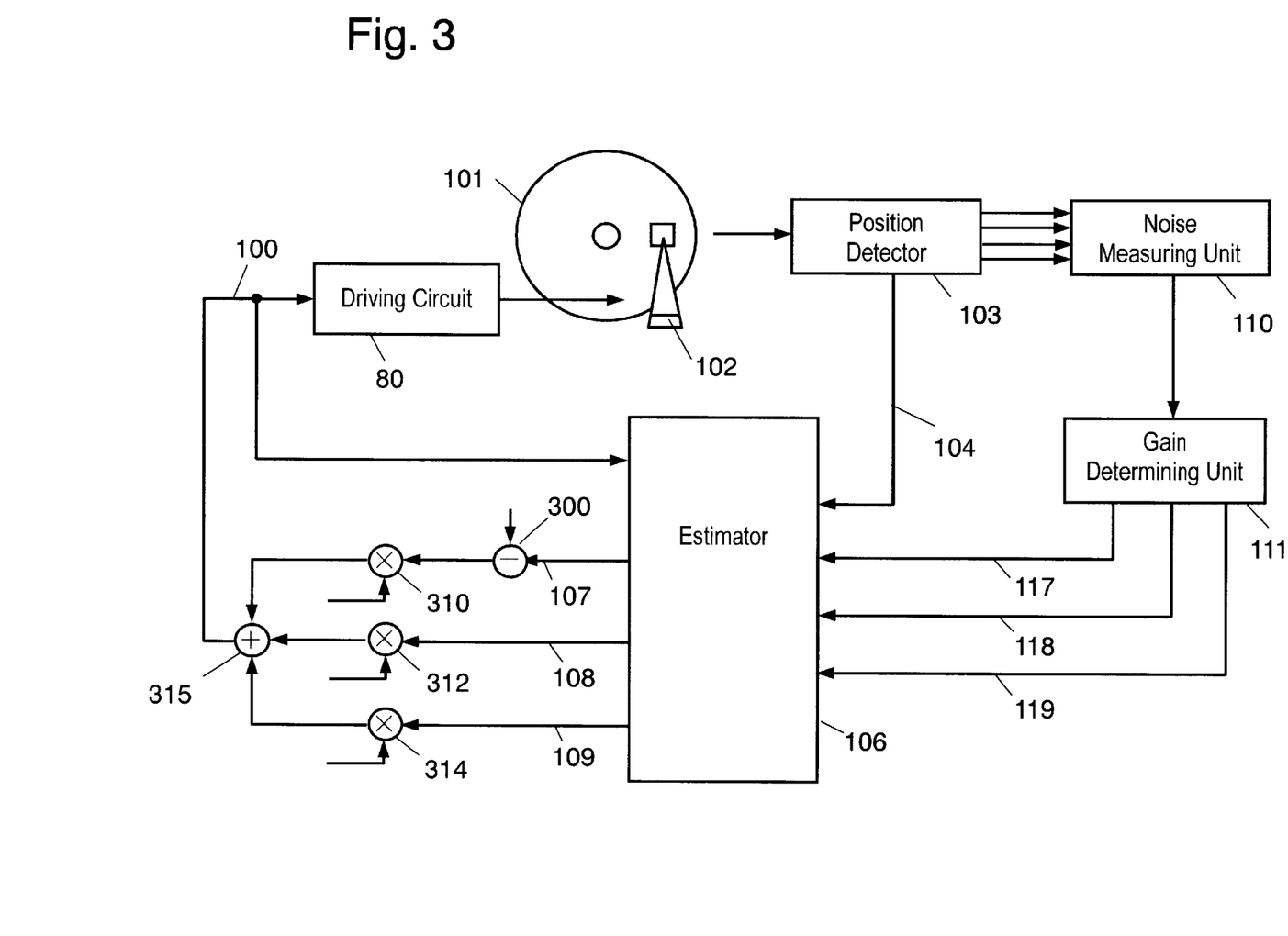
FIG. 3 is a schematic block diagram of a control apparatus of a disc device in embodiment 2 of the invention.

FIG. 3 is a schematic block diagram of control apparatus of disc device in embodiment 2 of the invention. In FIG. 3, same constituent elements shown in embodiment 1 are identified with same reference numerals. Hence, their explanation is omitted. As shown in FIG. 3, in embodiment 2, the following constituent elements are added to the constitution of embodiment 1.

Subtractor 300 for subtracting estimate position (XE1) from target position (DESPOS).

Multiplier 310 for multiplying subtraction result of subtractor 300 by specific coefficient.

Multiplier 312 for multiplying estimate speed (XE2) by specific coefficient.

Multiplier 314 for multiplying estimate deviation (XE3) by specific coefficient.

Adder 315 for summing up multiplication results of multiplies 310, 312, 314, and issuing control signal (U).

In this constitution, the drive circuit drives the voice coil motor (VCM) of the drive mechanism 102 according to the control signal (U). As a result, the magnetic head 90 is driven to follow up a specific track.

The procedure of calculation of control signal (U) in this embodiment is explained below by referring to FIG. 7 and FIG. 8.

<Step 700>

Detecting the amplitude of burst signals A, B, C, D detected by the magnetic head 90, the amplitude values are A/D converted, and position signals VA, VB, VC, VD are generated.

From the position signals VA, VB, VC, VD, the position information (POS) of the head in the track width direction is generated. In ordinary recording or reproducing, the position information (POS) is determined by the difference of signals VA and VB.

<Step 710>

This step consists of steps 601 to 603 in FIG. 6 explained in embodiment 1. This process is same as in embodiment 1, and its explanation is omitted.

<Step 720>

On the basis of formula 3 explained in embodiment 1, estimate position gain (LC1) and estimate speed gain (LC2) are calculated. Estimate deviation gain (LC3) is first determined according to the response speed of the control system, and is then set to a specified value corresponding to the variance value of noise measured at step 710.

<Step 730>

This is a step of calculating the control signal U. This step is described in detail below by referring to FIG. 8.

<Step 731>

This is a step of calculating estimate model position (XEP1), estimate model speed (XEP2), and estimate model deviation (XEP3). Specifically, they are calculated according to formula 6 explained in embodiment 1.

<Step 732>

Subtracting XEP1 from head position POS, estimate error (ESTERR) is calculated.

<Step 733>

Multiplying ESTERR by LC1, XEP1 is added to the multiplication result, and estimate position (XE1) is calculated.

<Step 734>

Multiplying ESTERR by LC2, XEP2 is added to the multiplication result, and estimate speed (XE2) is calculated.

<Step 735>

Multiplying ESTERR by LC3, XEP3 is added to the multiplication result, and estimate deviation (XE3) is calculated.

<Step 736>

Subtracting XE1 from target position (DESPOS), the subtraction result is multiplied by constant K1. XE2 is multiplied by constant K2, and XE3 is multiplied by constant K3. Summing up these multiplication results, the control signal U is calculated.

Constants K1, K2 are values determined depending on the response speed of control. In this embodiment, K3 is 1.

Figure 7:
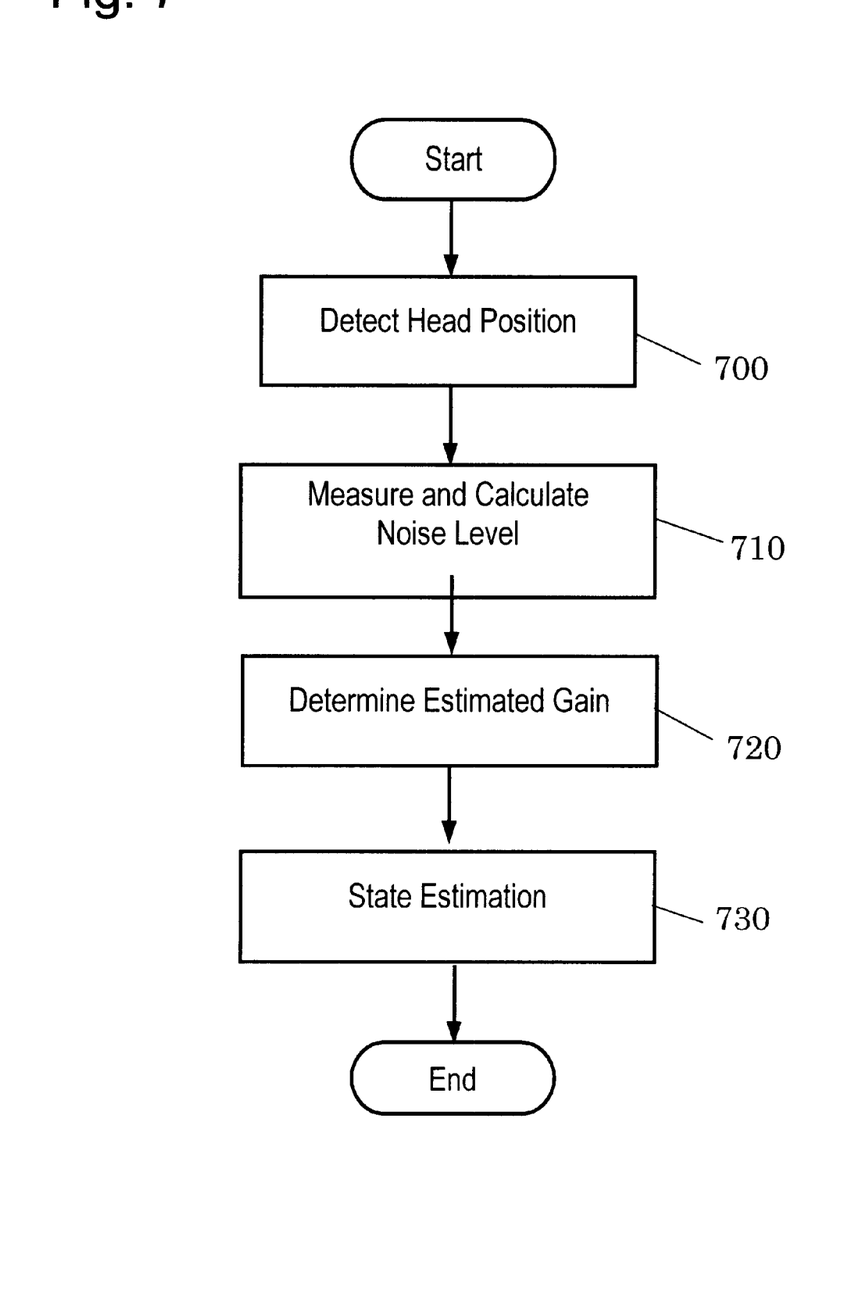
FIG. 7 is a schematic flowchart of calculation of control signal of disc device in embodiment 2 of the invention.
Figure 8:
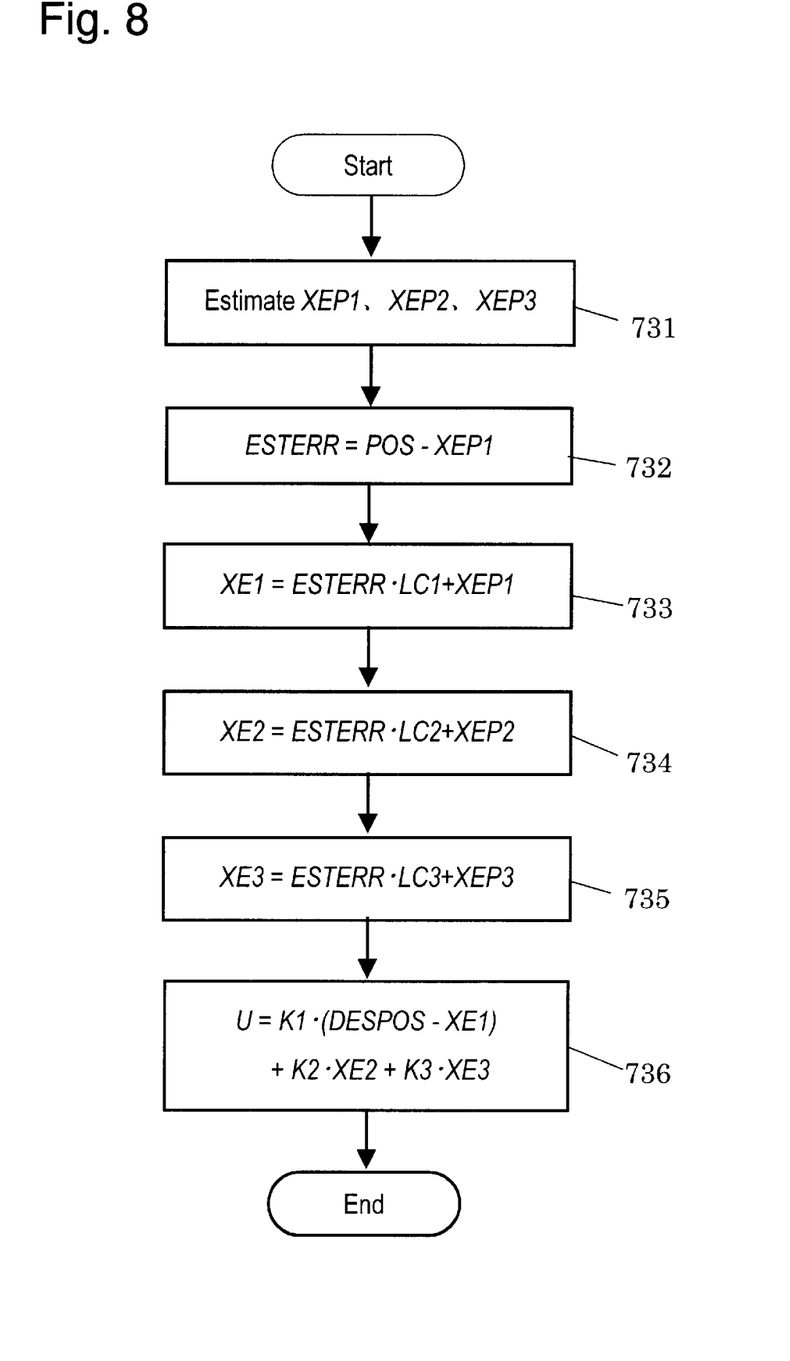
FIG. 8 is a flowchart of estimation of state of the disc device in embodiment 2 of the invention.

The control method of the disc device of the invention is explained by referring to FIG. 7 and FIG. 8, and the recording medium storing the computer program for executing these steps is also included in the scope of the invention.

Thus, the control apparatus, method and recording medium of the magnetic disc of the invention are capable of allowing the magnetic head to move and follow up at high precision to the target position when recording and reproducing the data by detecting the position information correctly. That is, if noise is superposed on the position signal, or if disturbance occurs in the actuator for moving the magnetic head, it is possible to control the magnetic head by high speed follow-up, precisely and stably.

Embodiment 3

This embodiment relates to inspection apparatus and inspection method of magnetic disc device in production process.

The structure of the inspection apparatus of the magnetic disc device of the invention is same as in embodiment 2 shown in FIG. 3, and the explanation of operation is omitted.

The inspection apparatus of magnetic disc device of the embodiment is designed to inspect the performance of the device by the variance value or standard deviation explained in embodiment 1.

Figure 9:
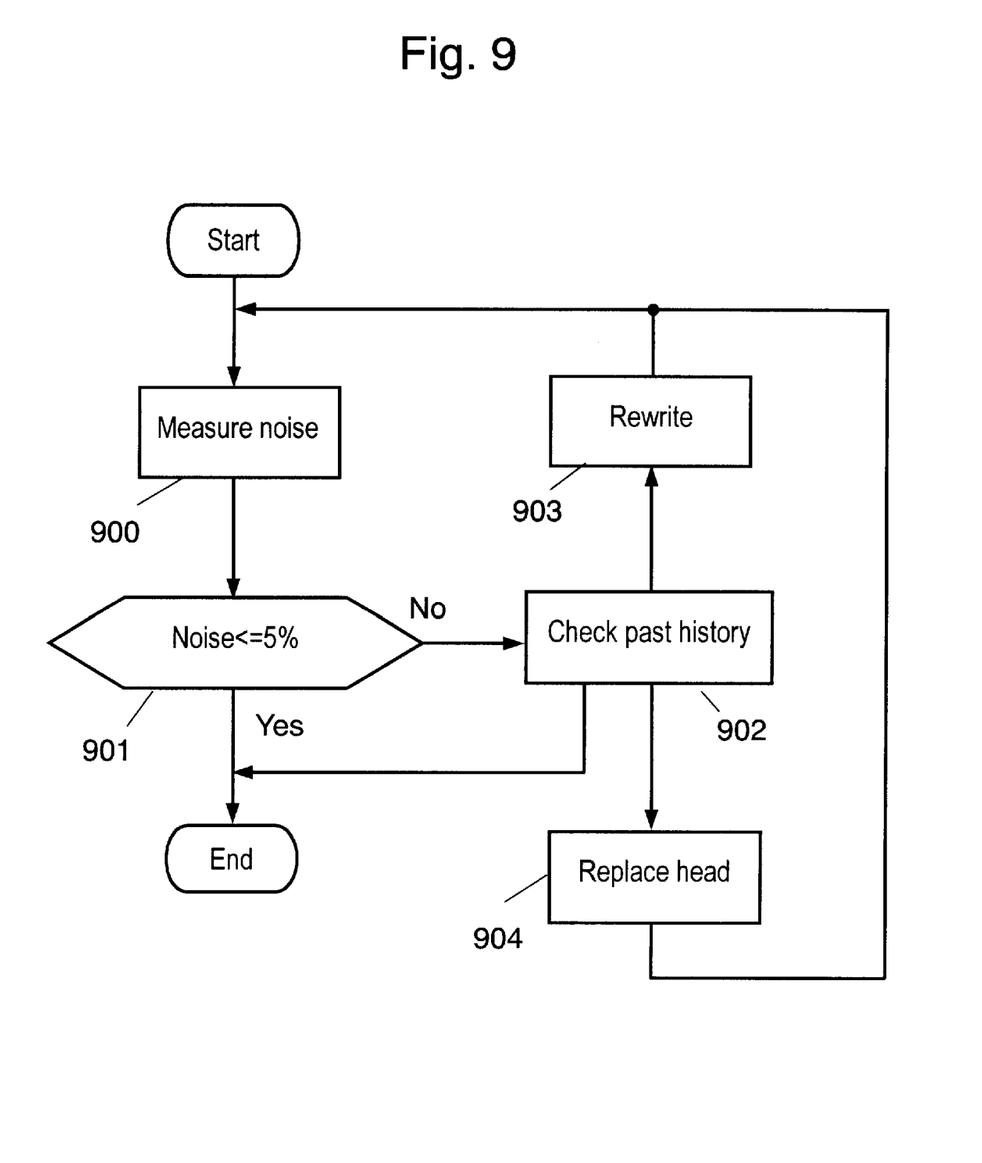
FIG. 9 is a flowchart of inspection process of magnetic disc device in embodiment 3 of the invention.

Referring to FIG. 9, the inspection procedure of the magnetic disc device is explained below.

<Step 900>

This step consists of steps 600 to 603 explained in embodiment 1. This process is same as in embodiment 1, and its explanation is omitted.

<Step 901>

If the variance value obtained at step 600 or the corrected variance value obtained at step 603 is greater than a predetermined value (for example, 5% of average), the process goes to step 902.

When the variance value is smaller than a predetermined value, the disc device is judged to be normal. The inspection is over.

<Step 902>

The inspection history is checked.

Depending on the result of checking, the following action is processed.

If the servo sector is not rewritten yet, the process goes to step 903. At step 903, the information in the servo sector is rewritten, and the process goes to step 900.

If the servo sector is already rewritten, and the disc is not replaced, the process goes to step 903. At step 903, the magnetic disc 101 is replaced, and position information is newly recorded in the servo sector. Then the process goes to step 900.

If the servo sector is already rewritten and the media is replaced, the process goes to step 904. At step 904, the magnetic head 90 is replaced, and the process goes to step 900.

If the servo sector is already rewritten and the media and magnetic head are replaced, it is judged to be defective, and the inspection is over.

What is claimed is:

1. A control apparatus of magnetic disc device having a magnetic disc including servo sectors recording track numbers and plural burst signals provided in plural data regions divided in the peripheral direction, and an actuator for driving a head for recording and reproducing data in said magnetic disc, comprising:

a position detector for detecting a head position of said head in track width direction from the burst signals, noise measuring means for measuring noise level superposed on the head position detected by said position detector, gain determining means for determining an estimate gain corresponding to the noise level, and an estimator for estimating state of said actuator.

2. The control apparatus of magnetic disc device of claim 1, wherein said estimator includes:

a model of said actuator, and a subtractor for calculating an estimate error, that is, the difference between the head position detected by said position detector, and a model position calculated from said model.

3. The control apparatus of magnetic disc device of claim 2, wherein said estimator (i) multiplies the estimate error by an estimate position gain determined by said gain determining means, and (ii) adds the model position to the multiplication result of the estimate error and the estimate position gain.

4. The control apparatus of magnetic disc device of claim 3, wherein said noise measuring means (i) adds amplitude values of the burst signals used in position control of said head, and (ii) calculates an average value and a fluctuation value of the added amplitude values, and the fluctuation value is obtained as the noise level.

5. The control apparatus of magnetic disc device of claim 4, wherein the fluctuation value is corrected by a head position detection gain, and the corrected fluctuation value is obtained as the noise level.

6. The control apparatus of magnetic disc device of claim 5, wherein a variance value or a standard deviation of the fluctuation value is obtained as the noise level.

7. The control apparatus of magnetic disc device of claim 2, wherein said estimator
   (i) multiplies the estimate error by an estimate speed gain determined by said gain determining means, and
   (ii) adds a model speed calculated from said model to the multiplication result of the estimate error and the estimate speed gain.

8. The control apparatus of magnetic disc device of claim 7, wherein said noise measuring means
   (i) adds amplitude values of the burst signals used in position control of said head, and
   (ii) calculates an average value and a fluctuation value of the added amplitude values, and the fluctuation value is obtained as the noise level.

9. The control apparatus of magnetic disc device of claim 8, wherein the fluctuation value is corrected by a head position detection gain, and the corrected fluctuation value is obtained as the noise level.

10. The control apparatus of magnetic disc device of claim 9, wherein a variance value or a standard deviation of the fluctuation value is obtained as the noise level.

11. The control apparatus of magnetic disc device of claim 2, wherein said estimator
    (i) multiplies the estimate error by an estimate deviation gain determined by said gain determining means, and
    (ii) adds a estimate model deviation calculated from said model to the multiplication result of the estimate error and the estimate deviation gain.

12. The control apparatus of magnetic disc device of claim 11 wherein said noise measuring means
    (i) adds amplitude values of the burst signals used in position control of said head, and
    (ii) calculates an average value and a fluctuation value of the added amplitude values, and the fluctuation value is obtained as the noise level.

13. The control apparatus of magnetic disc device of claim 12, wherein the fluctuation value is corrected by a head position detection gain, and the corrected fluctuation value is obtained as the noise level.

14. The control apparatus of magnetic disc device of claim 13, wherein a variance value or a standard deviation of the fluctuation value is obtained as the noise level.

15. The control apparatus of magnetic disc device of claim 2, wherein said estimator
    (i) multiplies the estimate error by an estimate position gain determined by said gain determining means,
    (ii) adds the model position to the multiplication result of the estimate error and the estimate position gain, thereby calculating an estimate position,
    (iii) multiplies the estimate error by an estimate speed gain determined by said gain determining means,
    (iv) adds a model speed calculated from said model to the multiplication result of the estimate error and the estimate speed gain, thereby calculating an estimate speed,
    (v) multiplies the estimate error by an estimate deviation gain determined by said gain determining means,
    (vi) adds a model deviation calculated from said model to the multiplication result of the estimate error and the estimate deviation gain, thereby calculating an estimate deviation, and
    (vii) adds the estimate position, the estimate speed, and the estimate deviation by a predetermined ratio.

16. The control apparatus of magnetic disc device of claim 15, wherein said noise measuring means
    (i) adds amplitude values of the burst signals used in position control of said head, and
    (ii) calculates an average value and a fluctuation value of the added amplitude values, and the fluctuation value is obtained as the noise level.

17. The control apparatus of magnetic disc device of claim 16, wherein the fluctuation value is corrected by a head position detection gain, and the corrected fluctuation value is obtained as the noise level.

18. The control apparatus of magnetic disc device of claim 17, wherein a variance value or a standard deviation of the fluctuation value is obtained as the noise level.

19. The control apparatus of magnetic disc device of claim 2, wherein said noise measuring means
    (i) adds amplitude values of the burst signals used in position control of said head, and
    (ii) calculates an average value and a fluctuation value of the added amplitude values, and the fluctuation value is obtained as the noise level.

20. The control apparatus of magnetic disc device of claim 19, wherein the fluctuation value is corrected by a head position detection gain, and the corrected fluctuation value is obtained as the noise level.

21. The control apparatus of magnetic disc device of claim 20, wherein a variance value or a standard deviation of the fluctuation value is obtained as the noise level.

22. The control apparatus of magnetic disc device of claim 1, wherein said noise measuring means
    (i) adds amplitude values of the burst signals used in position control of said head, and
    (ii) calculates an average value and a fluctuation value of the added amplitude values, and the fluctuation value is obtained as the noise level.

23. The control apparatus of magnetic disc device of claim 22, wherein the fluctuation value is corrected by a head position detection gain, and the corrected fluctuation value is obtained as the noise level.

24. The control apparatus of magnetic disc device of claim 23, wherein a variance value or a standard deviation of the fluctuation value is obtained as the noise level.

25. An inspection apparatus of magnetic disc device having a magnetic disc including servo sectors recording track numbers and plural burst signals provided in plural data regions divided in peripheral direction, and an actuator for driving a head for recording and reproducing data in said magnetic disc,
    wherein said inspection apparatus
       (i) adds amplitude values of burst signals used in position control of said head,
       (ii) calculates an average, and a variance value or a standard deviation of the added amplitude values, and
       (iii) inspects said magnetic disc device by the variance value or the standard deviation.

26. The inspection apparatus of magnetic disc device of claim 25, wherein the average and variance value are corrected by a head position detection gain.

27. A control method of magnetic disc device having a magnetic disc including servo sectors recording track numbers and plural burst signals provided in plural data regions divided in peripheral direction, and an actuator for driving a head for recording and reproducing data in said magnetic disc, comprising the steps of:

(a) detecting a head position in track width direction from said burst signals, (b) measuring noise level superposed on the head position, (c) determining an estimate gain corresponding to the noise level, and (d) estimating a state of said actuator.

28. The control method of magnetic disc device of claim 27, wherein said step (c) determines an estimate position gain, an estimate speed gain, and an estimate deviation gain, and said step (d) comprising the steps of:

(d1) calculating a model position, a model speed, and a model deviation from the model of said actuator, (d2) calculating an estimate error, that is, the difference between the head position and the model position, (d3) multiplying the estimate error by the estimate position gain, and adding the model position to the multiplication result to calculate an estimate position, (d4) multiplying the estimate error by the estimate speed gain, and adding the model speed to the multiplication result to calculate an estimate speed, (d5) multiplying the estimate error by the estimate deviation gain, and adding the model deviation to the multiplication result to calculate an estimate deviation, and (d6) adding the estimate position, estimate speed, and estimate deviation by a predetermined ratio.

29. An inspection method of magnetic disc device having a magnetic disc including servo sectors recording track numbers and plural burst signals provided in plural data regions divided in peripheral direction, and an actuator for driving a head for recording and reproducing data in said magnetic disc, comprising the steps of:

adding amplitude values of burst signals used in position control of said head, calculating an average value, and a variance value or a standard deviation of the added amplitude values, and inspecting the magnetic disc device by the variance value or the standard deviation.

30. The inspection method of magnetic disc device of claim 29, wherein the variance value or the standard deviation is corrected by the head position detection gain.

31. A recording medium storing a computer program data for executing a control method of magnetic disc device having a magnetic disc including servo sectors recording track numbers and plural burst signals provided in plural data regions divided in the peripheral direction, and an actuator for driving a head for recording and reproducing data in said magnetic disc, wherein the stored computer program comprises:

(a) a program for detecting a head position of said head in the track width direction from said burst signals, (b) a program for measuring noise level superposed on the head position, (c) a program for determining an estimate gain corresponding to the noise level, and (d) a program for estimating a state of said actuator from the model of the actuator.

32. The recording medium of claim 31, wherein said program (c) is composed of a program for determining an estimate position gain, an estimate speed gain, and an estimate deviation gain, and said program (d) includes:

(d1) a program for calculating a model position, a model speed, and a model deviation from said model, (d2) a program for calculating an estimate error, that is, the difference between the head position and the model position, (d3) a program for multiplying the estimate error by the estimate position gain, and adding the model position to the multiplication result to calculate an estimate position, (d4) a program for multiplying the estimate error by the estimate speed gain, and adding the model speed to the multiplication result to calculate an estimate speed, (d5) a program for multiplying the estimate error by the estimate deviation gain, and adding the model deviation to the multiplication result to calculate an estimate deviation, and (d6) a program for adding the estimate position, the estimate speed, and the estimate deviation by a predetermined ratio.

* * * * *